US005225852A

United States Patent [19]

Uchida et al.

[11] Patent Number: 5,225,852

[45] Date of Patent: Jul. 6, 1993

[54] RECORDING MATERIAL TRANSPORT DEVICE AND RECORDING APPARATUS HAVING THE SAME

[75] Inventors: Takashi Uchida; Tomohiro Aoki, both of Yokohama; Tohru Kobayashi, Tokyo; Masatoshi Ikkatai, Kanagawa; Yasushi Murayama, Tokyo; Tatsuo Mitomi, Yokohama; Masaharu Nemura, Yokohama; Yasuyuki Takanaka, Yokohama, all of Japan

[73] Assignee: Canon Kabushiki Kaisha, Tokyo, Japan

[21] Appl. No.: 685,732

[22] Filed: Apr. 16, 1991

[30] Foreign Application Priority Data

Apr. 17, 1990 [JP] Japan .................................. 2-099388
Apr. 12, 1991 [JP] Japan .................................. 3-080069

[51] Int. Cl.$^{5}$ ........................ G01D 15/24; B41J 29/18

[52] U.S. Cl. .................................... 346/134; 400/708; 346/140 R

[58] Field of Search ........................... 346/134, 140 R; 198/804, 847; 400/708

[56] References Cited

U.S. PATENT DOCUMENTS

| | | | |
|---|---|---|---|
| 4,313,124 | 1/1982 | Hara | 346/140 |
| 4,345,262 | 8/1982 | Shirato et al. | 346/140 |
| 4,459,600 | 7/1984 | Sato et al. | 344/140 |
| 4,463,359 | 7/1984 | Ayata et al. | 346/1.1 |
| 4,558,333 | 12/1985 | Sugitani et al. | 346/107 |
| 4,723,129 | 2/1988 | Endo et al. | 346/1.1 |
| 4,727,437 | 2/1988 | Mizoguchi | 358/304 |
| 4,740,796 | 4/1988 | Endo et al. | 346/1.1 |
| 4,793,605 | 12/1988 | Tajima | 271/9 |
| 4,823,942 | 4/1989 | Martin et al. | 198/847 |
| 4,887,101 | 12/1989 | Hirose et al. | 346/134 |

FOREIGN PATENT DOCUMENTS

| | | | |
|---|---|---|---|
| 2-106530 | 4/1990 | Japan | 198/847 |

*Primary Examiner*—Benjamin R. Fuller
*Assistant Examiner*—Alrick Bobb
*Attorney, Agent, or Firm*—Fitzpatrick, Cella, Harper & Scinto

[57] ABSTRACT

A transport device for use in a recording apparatus is disclosed. The transport device includes a conveyor belt having at least three layers. The upper layer of the belt is a conductive or semiconductive layer that is discriminable from a recording material by a detector. Below the first conductive or semiconductive layer is an insulating layer and below the insulating layer is a third conductive layer. The first layer has a volume resistivity value of from $10^{14}$ to $10^{17}\Omega$cm. The detectors are positioned upstream and downstream of the recording region and disposed downstream of that recording region is a cleaning blade and absorber which together work under control of a controller to clean ink from the conveyor before it soils the charging roller or the next recording sheet. The controller also controls the cleaning operation in accordance with the amount of ink that was unnecessarily jetted onto the conveyor belt.

19 Claims, 9 Drawing Sheets

FIG. 9

| INK INJECTION AMOUNT (INK JETTING AMOUNT) (cc) | BLADE CLEANING TIME n (sec) | ABSORBOR CONTACT TIME m (sec) | NUMBER OF TIMES k (TIME) |
|---|---|---|---|
| 0 ~ 0.3 | P | 5 | 1 |
| 0.3 ~ 0.6 | P | 8 | 2 |
| 0.6 ~ 0.9 | 2P | 12 | 2 |
| 0.9 < | 2P | 18 | 2 |

※ P DESIGNATES TIME REQUIRED FOR ONE ROTATION OF BELT 211

RECORDING MATERIAL TRANSPORT DEVICE AND RECORDING APPARATUS HAVING THE SAME

BACKGROUND OF THE INVENTION

1. Field of the Invention

The present invention relates to a transport means for transporting a recording material and a recording apparatus having the transport means.

2. Description of the Related Art

In recording apparatus, such as a copying machine or a printer, a recording material is generally transported from a sheet feeding station, such as a cassette, through an image forming station and to a sheet eject station. In such cases, conveyance of the recording material is controlled at a predetermined timing as the recording material is led from the sheet feeding station to the image forming station, recorded with an image, and ejected. It is necessary for the transport of the recording sheet material to be precise, especially since the timing of transport from the feed of the recording material to the image recording location influences the image recording position on the recording material. Furthermore, if the conveyance speed of the recording material during image recording is not kept constant, the magnification of the image varies and the image recorded on the recording material is partially expanded and contracted. Slippages among images recorded by the different recording heads therefore occur, especially in the case of an image recording apparatus in which a plurality of image recording heads are disposed side by side. In the case of a color image recording apparatus, such phenomenon results in color slippage and color irregularity, which are critical defects for high-quality image forming. Therefore, it is necessary to precisely drive a transport means and exactly transmit the conveying force of the transport means to the recording material in order to avoid the above problems.

With the above problems in view, various kinds of transport systems have been suggested. For example, a conventional conveyor system conveys a recording material by a pair of rollers and regulates the conveying direction by a guide. Since such a conveyor system feeds the recording material out by pressure between the rollers, the conveying force thereof is strong and the conveyance is reliable and simple. However, the pair of rollers must be placed with the minimum length of a recording material to be used in mind, and such a conveyor system is unsuitable for the conveyance of, for example, postcard-sized and visiting-card-sized recording materials. Furthermore, the system cannot be used in an apparatus, such as an electrophotographic apparatus, where the system cannot be allowed to contact the recording surface of the recording material at any point between the transfer of an image on the recording material by a drum and the fixing thereof.

Another method transports a recording material by nipping and pulling the leading edge of the recording material by a gripper. In this case, once the gripper nips the recording material, the conveying force is surely strong and reliable. However, the mechanism is complicated. Furthermore, the transport system is undesirable in that it is difficult to time the nip of the leading edge of the recording material by the gripper and a mark from the gripper is made on the recording material.

A still further method uses a fan or the like to suck a recording material from the rear of an endless belt with many holes, adhere the recording material to the belt by negative pressure generated by the suction, and convey the recording material. Although this method has been used to convey the recording material prior to fixing of a toner image in electrophotography, since the conveyance is executed by only the suction from the rear, the conveying force is small. Furthermore, it is likely that the surface of the belt will be soiled since dust and toner in the apparatus are also sucked.

In order to solve the above problems, a transport device using an electrostatic suction method shown in FIG. 1 has been suggested by the applicant of the present invention for a color ink jet recording apparatus.

The color ink jet recording apparatus will now be schematically described with reference to FIG. 1. A scanner station 101 reads an image from a document 103 laid on a document table 102 and converts the image into electrical signals and a printer station 201 records on a recording material 203 in accordance with the converted electrical signals. In the scanner station 101, a document scanning unit 104 scans in the direction indicated by the arrow A and reads the image from the document 103. Reference numerals 105, 106 and 107 denote an exposure means, a rod array lens and an equivalent magnification color separation line sensor (color image sensor), respectively. When the lamp of the exposure means 105 is lit during the scanning by the document scanning unit 104 and document 103 is irradiated, the light reflected by document 103 is focused onto the color image sensor 107 through the rod array lens 106, and image information on the document 103 is read for respective colors and converted into digital signals.

In the printer station 201, a cassette 202 feeds recording sheets 203. The feeding operation of the recording sheets 203 stored in the cassette 202 is performed by a feeding roller 202A. The feeding roller 202A feeds recording sheets 203 one by one from the cassette 202 and through conveying rollers 202B. A resist roller 204 temporarily stops the recording sheets 203 at an outlet thereof and then feeds out the recording sheet 203 onto an endless belt 211 in a belt conveyer station 210 according to the document read timing. A recording head unit 220 is composed of a plurality of recording heads 221 for jetting different inks, that is, a head BK for a black ink, a head Y for a yellow ink, a head M for a magenta ink and a head C for a cyan ink. The full-line heads 221 each have an unillustrated ink jet opening disposed corresponding to the recordable width of the sheet and placed at a predetermined space from the endless belt 211.

A recovery cap means 230 is sealed on the jetting openings of the recording heads 221 at non-recording time and recovery time from defective jetting. While a recording operation is performed by the recording head unit 220, the recording head unit 220 and the recovery cap means 230 are maintained in the state shown in FIG. 1, respectively. Reference numerals 240 and 250 denote an eject station for ejecting the recorded sheet 203 after fixing, and an eject tray.

Furthermore, reference numerals 202B, 202C, 202D and 202E denote a conveying roller, a manual supply table, a supply roller and an eject roller, respectively, and reference numerals 202F and 202G denote platens.

The belt conveyor station 210 will now be described in detail. The endless belt 211 (referred to as a conveyor belt hereinafter) is looped between a driving roller 212 and a driven roller 213. A charging roller 214 charges the belt 211 so as to adhere the recording sheet 203 onto the belt 211, a cleaner member 215 is disposed on the exit side of the belt conveyor station 210 and cleans the belt 211 soiled by ink as described below, and a platen 216 is disposed at the rear of the conveyor belt 211 and opposite to the recording head unit 220. A conductive presser member 217 for pressing the recording sheet 203 onto the belt 211 and electrically grounding the recording sheet 203 is mounted on the belt 211 on the entrance side of the belt conveyor station 210.

FIG. 2 shows the construction of the conveyor belt 211. Reference numeral 211A denotes an insulating layer made of an insulating material and which forms the surface of the conveyor belt 211. A conductive layer 211B made of an elastic and conductive material, for example, a conductive rubber or the like, is below the insulating layer 211A. An indented layer 211C is attached to the inside of the conductive layer 211B and has a repeating dent structure.

In the color ink jet recording apparatus having such a construction, the printer station 201 performs a recording operation based on the image information read from the document by the scanner station 101. Then, the recording sheet 203 fed out from the cassette 202 is fed into the belt conveyor station 210 in the timing in accordance with the document reading after being registered by the resist roller 204. The ink is jetted onto the recording sheet 203 at an appropriate timing for recording heads 221 so as to perform a recording operation. Then, the recorded sheet 203 is fixed and ejected onto the eject tray 250 through the eject station 240. A sheet detection sensor 261 is disposed immediately in front of the resist rollers 204 and a sheet detection sensor 262 is disposed in the eject station 240. The resist rollers 204 start rotating in response to a sheet detection signal from the sheet detection sensor 261 or in response to a signal from the scanner station 101 in synchronization with the sheet detection signal, and the resist rollers 204 then feeds the recording sheet 203 into the belt conveyor station 210. The sheet detection sensor 262 confirms ejection of the recording sheet 203, and determines that jamming has occurred when the sheet detection sensor 262 does not detect recording sheet 203 within a predetermined time from when the sheet detection sensor 261 has detected recording sheet 203.

However, because of the sequence of operations in the above recording apparatus, if the recording material 203 jams between resist rollers 204 and the recording head unit 220 in the printer station 201, a recording signal has been already transmitted to each of the recording heads 221, and it is therefore likely that the ink will be jetted onto the conveyor belt 211 in the belt conveyor station 210. Furthermore, since the paper jam is not recognized in this state until the recording sheet 203 reaches the next sheet detection sensor, for example, the ejection detection sensor 262, the recording operation is likely to continue. In this case, large amounts of ink are jetted onto the conveyor belt 211. The conveyor belt 211 is cleaned by the cleaner member 215, which normally does not operate during a recording operation. Thus, during a recording operation a cleaning member thereof (for example, a blade member) is not in contact with the conveyor belt 211. This is because it is necessary to minimize the torque loaded on the conveyor belt 211 during the recording operation since high precision is necessary for the drive of the conveyor belt 211, as described above. Therefore, if the above accident happens during the recording onto a long recording sheet of, for example, A3 size, it is likely that the part of the conveyor belt 211 where the ink is jetted will pass the position of the cleaner member 215 and move downstream, and that the ink adhered onto that part will be transferred onto the charging roller 214 and soil the charging roller 214.

Furthermore, it is also likely that the rear surface of the recording sheet will become soiled since the ink is transferred again from the charging roller 214 onto the conveyor belt 211 during the next recording operation.

SUMMARY OF THE INVENTION

An object of the present invention is to provide a transport means capable of achieving a high-quality recording without any slippage of the recording medium, and a recording apparatus having the transport means.

Another object of the present invention is to provide a transport means capable of preventing ink from being jetted thereon when a recording material jams, and a recording apparatus having the transport means.

A further object of the present invention is to provide a transport means capable of properly cleaning the soil resulting from adhesion of ink and the like thereon, and a recording apparatus having the transport means.

A still further object of the present invention is to provide a recording apparatus capable of minimizing the amount of ink jetted onto a conveyor belt when jamming or the like happens in a belt conveyor station in order to solve the above problems.

In one aspect of the invention, there is provided a transport device for use in a recording apparatus including a recorder for recording onto a recording material and detection means for detecting recording material. The transport device includes a conveyor belt having a first conductive or semiconductive layer discriminable from a recording material by the detection means, a second insulating layer below the first layer and a third conductive layer below the second layer. A drive means drives the belt and a charging means charges the belt as it is driven.

In a second aspect of the invention, there is provided a recording apparatus in which a recording material is conveyed by an endless charged belt and a recording head records on the recording material in a predetermined recording region. Detection means detect a jam of the recording material in the recording region. The conveyor belt includes a first layer made of a conductive or semiconductive material having a thickness of 5 to 30 $\mu m$ and a volume resistivity value lower than a predetermined value and which is discriminable from a recording material by the detection means. A second insulating layer is below the first layer and a third conductive layer is below the second layer. Cleaning means are disposed downstream of the recording region and in contact with the conveyor belt to clean the surface of the conveyor belt.

In still another aspect of the invention, there is provided a recording apparatus for performing recording onto a recording material by means of an ink jet head for jetting ink onto said recording material. Detection means detect a jam of the recording material, transport means transports the recording material, cleaning means clean ink from the transport means, and control means controls a cleaning operation by the cleaning means in accordance with the amount of ink jetted from the ink jet head after detection of the jam by the detection means.

BRIEF DESCRIPTION OF THE DRAWINGS

FIG. 9 is a look-up table stored in memory.

DETAILED DESCRIPTION OF THE PREFERRED EMBODIMENT

Preferred embodiments of the present invention will now be described in detail and specifically with reference to the drawings.

Figure 3:
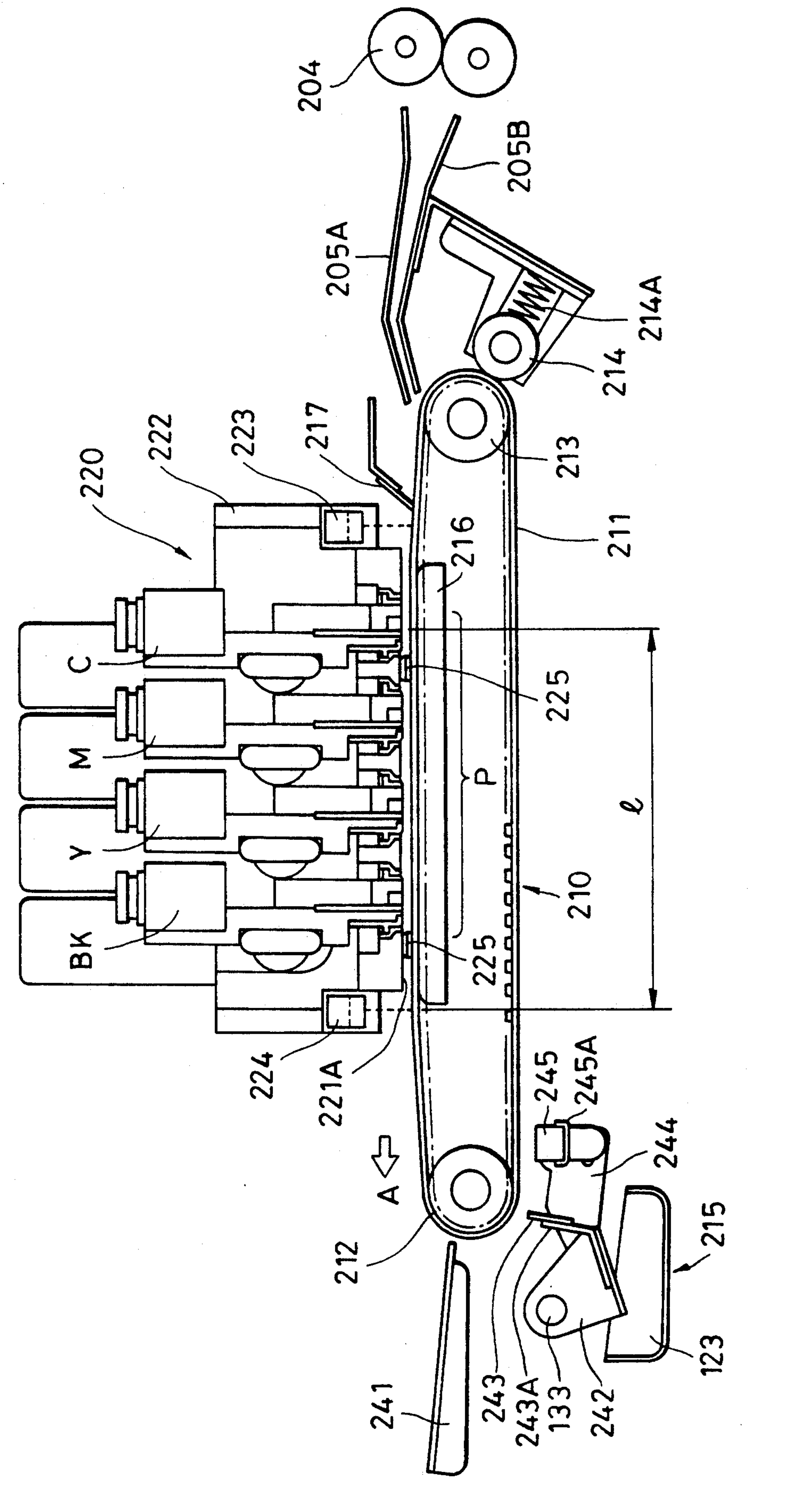
FIG. 3 is a side view showing the construction of an embodiment of the present invention.

FIG. 3 shows an embodiment to which the present invention is applied. The main parts concerned with a recording operation, including a recording head unit 220 and a belt conveyor station 210, will first be described in detail. Upper and lower guide plates 205A and 205B lead a recording sheet fed out from resist rollers 204 onto a conveyor belt 211. Electrode springs 214A are disposed at both ends of charging roller 214 so as to press charging roller 214 against conveyor belt 211, and electrode springs 214A are connected to an unillustrated high voltage power supply. At the same time that recording sheet 203 reaches the resist rollers 204 and conveyor belt 211 starts to be driven by a drive motor 102M (shown in FIG. 8), a voltage of several KV is applied to charging roller 214 via electrode springs 214A from the high voltage power supply, thereby charging the surface of the conveyor belt 211.

Recording sheet 203, which is fed out from resist rollers 204 in accordance with the timing of the document reading, comes into contact with the charged conveyor belt 211. Since charges each having a phase reverse to that of conveyor belt 211 are attracted to the belt 211 due to the polarization on the recording sheet 203, the recording sheet 203 is thereby adhered to the conveyor belt 211. Then, the recording sheet 203 is pressed against the belt 211 by conductive presser member 217 and is adhered to the belt 211 even more firmly since the presser member 217 is grounded.

The recording sheet 203, held on the conveyor belt 211 as described above, is led to recording region P along a platen 216 whose flatness is approximately 0.05 to 0.10, and recording on the recording sheet 203 is performed by the recording head unit 220 at a recording region P. A head holder 222 fixes and holds a plurality of recording heads 221, and reflective optical sensors 223 and 224 are disposed at both ends of the head holder 222, that is, at the upstream and downstream positions of the head holder 222 along the conveyor belt 211, respectively. Sensors 223 and 224 detect the presence of the recording sheet 203 on the conveyor belt 211 based on the reflective light from the recording sheet 203 and the conveyor belt 211, and are referred to as a first sensor 223 and a second sensor 224 hereinafter. The detection operation thereof will be described below.

Two positioning pins 225 are disposed in the front and rear portions at each side of the upper surface of the platen 216 along the conveyor belt 211, and determine the vertical position of the recording head unit 220. By having the lower surface of head holder 222 abut against the upper surfaces of the positioning pins 225, a predetermined space is maintained between ink jetting surfaces 221A of the recording heads 221 and the recording on sheet 203.

After recording sheet 203 is recorded in the recording region P, it is conveyed in the direction A by the conveying force of the conveyor belt 211, separated from the conveyor belt 211 by a driving roller 212 by curvature separation, advanced along a guide plate 241, fixed at the next fixing position, and ejected.

A cleaner member 215 is placed so as to be in contact with conveyor belt 211 downstream from where recording sheet 203 is separated from conveyor belt 211, and has a blade 243 mounted to a bracket 242 and an ink absorber 245 mounted to another bracket 244, which are held apart from the surface of the conveyor belt 211 as shown in FIG. 3 when a normal recording operation is performed. This is because the drive of the conveyor belt 211 influences the recording quality and must be precise as described above. Therefore, the cleaner 215 is separated from conveyor belt 211 during the recording operation so that any unnecessary load is not borne by conveyor belt 211. As described below, the cleaner member 215 is in contact with the conveyor belt 211 so as to perform a cleaning operation only when it is necessary to clean the conveyor belt 211.

Figure 1:
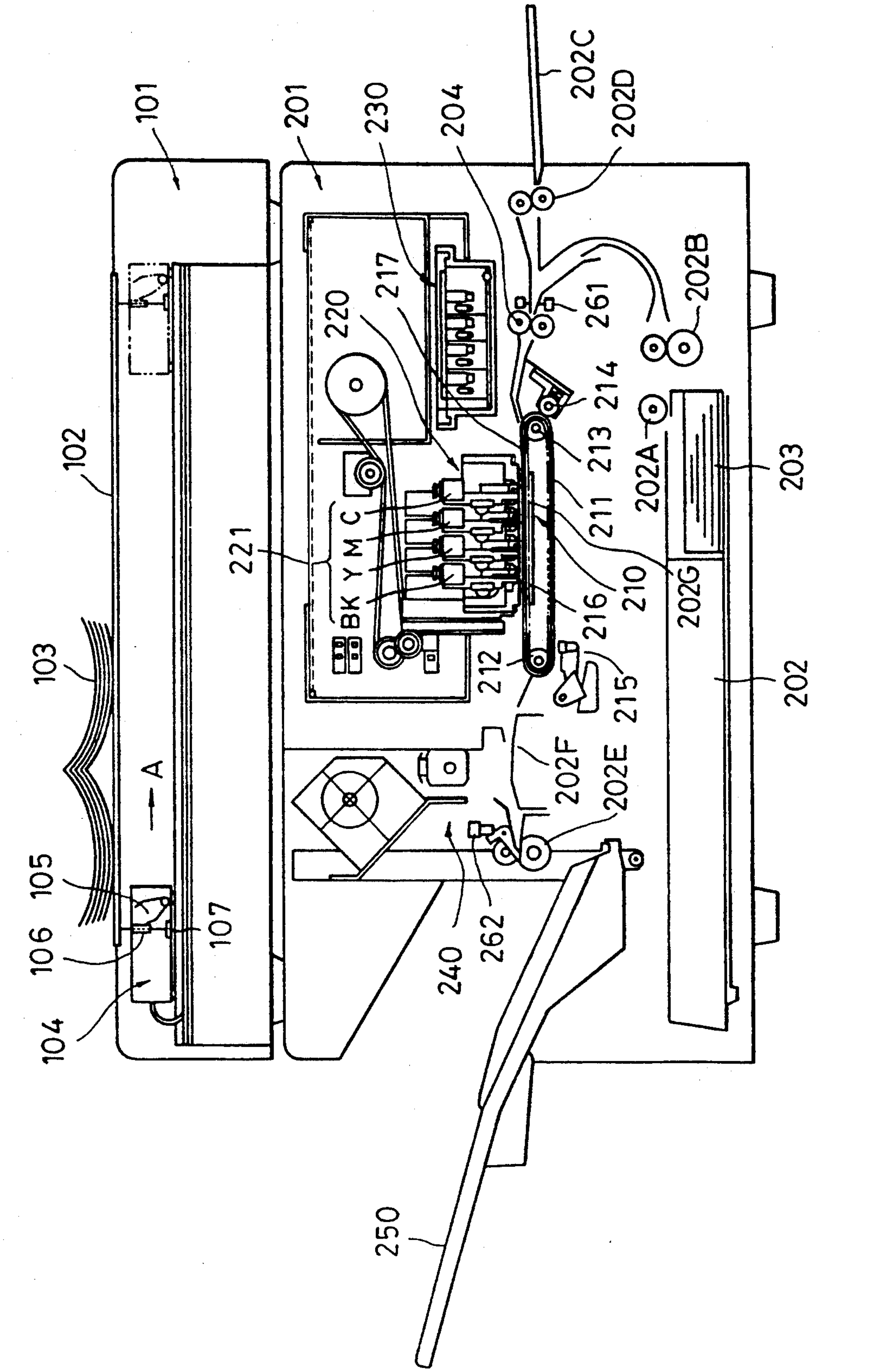
FIG. 1 PRIOR ART
FIG. 1 is a side view showing the construction of a color ink jet recording apparatus which has been suggested by the applicant of the present invention.
Figure 2:
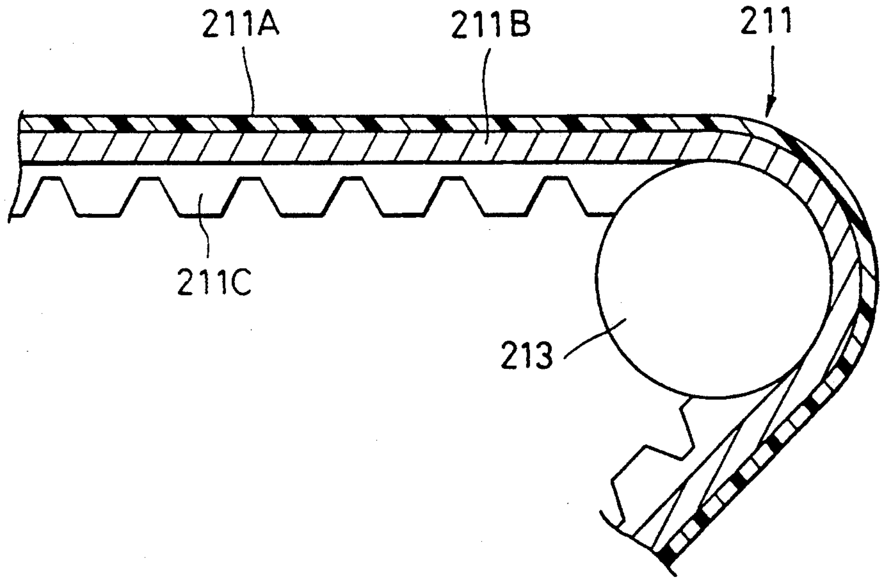
FIG. 2 PRIOR ART
FIG. 2 is a view showing the construction of a conveyor belt of the color ink jet recording apparatus.
Figure 4:
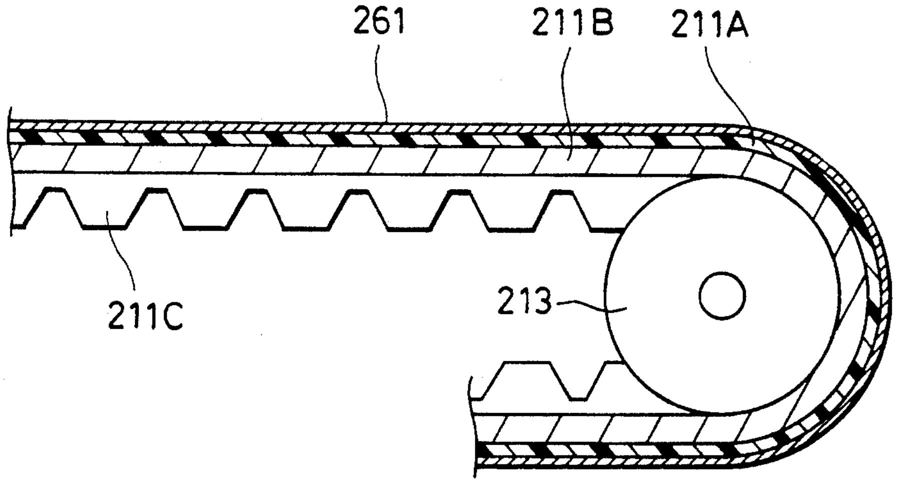
FIG. 4 is a side view showing the construction of a conveyor belt according to the present invention.

The conveyor belt 211 will now be described in detail with reference to FIG. 4. Although the construction of an insulating layer 211A, a conductive layer 211B and an indented layer 211C is not different from that shown in FIG. 2, a discrimination detection layer 261 is further mounted on the insulating layer 211A in this embodiment. The discrimination detection layer 261 facilitates differentiation by the first and second sensors 223 and 224 between the surfaces of the recording sheet 203 and of the conveyor belt 211. It has a volume resistivity value of less than $10^{13}\Omega$cm, and preferably, of approximately $10^{14}$ to $10^{17}\Omega$cm, and is made of a conductive or semiconductive material, and maintains a conveyance thickness error of less than $\pm 20\mu$ in consideration of the recording precision. In this embodiment, the discrimination detection layer 261 is formed by applying, for example, an application agent including pigment of a color having a different reflectance from that of recording sheet 203, a urethane or silicon black paint in this embodiment, onto the insulating layer 211A by the thickness of 5 to $30\mu$, and preferably, approximately $10\mu$, by using a spray or the like. In addition, the insulating layer 211A itself may be of the above color. However, if the insulating layer 211A is, for example, black or the like, since carbon or the like is generally combined, the resistance value of the insulating layer 211A is lowered and its function of adhering the recording sheet 203 is inhibited.

In the recording apparatus having such a structure, recording on recording sheet 203 is performed in the recording region P only when the recording sheet 203 is normally conveyed by the conveyor belt 211. Therefore, the ink is not inadvertently jetted onto the conveyor belt 211. Furthermore, since the conveyance of the recording sheet 203 is monitored by the first and second sensors 223 and 224, if the recording sheet 203 is not detected once a predetermined amount of time has passed after the resist rollers 204 start to rotate, or if the detection is continued, it is determined that a jam has occurred and the sequence of operations related to the recording is stopped.

If a jam occurs upstream of the first sensor 223, since the recording operation by the recording head 221 is stopped, it is unlikely that the conveyor belt 211 will be soiled by the ink. If the jam occurs between the first sensor 223 and the second sensor 224, the ink is likely to be jetted onto the conveyor belt 211 within the range indicated by l in FIG. 3. However, since the second sensor 224 immediately detects that the recording sheet 203 has not passed and is thus jammed, the conveying operation of the belt conveyor station 210 is stopped. The part of the conveyor belt 211 which is soiled by the ink has not passed the position of the cleaner member 215. Therefore, when the conveyor belt 211 is stopped after the above sequence of operations, the blade 243 is brought into contact with the surface of the conveyor belt 211 and the conveyor belt 211 is again driven, and the ink on the conveyor belt 211 is swept aside by the blade 243. Subsequently, the blade 243 is separated from the surface of the conveyor belt 211. The ink absorber 245 is then brought into contact with the surface of the conveyor belt 211 so as to be in contact with the ink, which was swept on the conveyor belt 211 by the blade 243, for a predetermined time, and the ink is absorbed by the absorber 245. After that, the cleaner member 215 is separated from the surface of the conveyor belt 211 and returned to the initial position thereof, so that a normal recording sequence is performed again. Although the conveyor belt 211 from which the ink is thus swept away is charged again by the charging roller 214, since the ink is entirely removed from the conveyor belt 211, no ink is transferred onto the charging roller 214.

In the above embodiment, the jam caused at the region opposite to the recording heads is detected by sensors 223, 224 disposed in the front and at the rear of the recording head unit, respectively. However, the detection method is not limited to this embodiment. For example, if other sensors are mounted between the recording heads so as to subdivide the jam position, it is possible to further narrow the region where the ink is incorrectly jetted when a jam occurs and to facilitate the sweep of ink from the conveyor belt.

Furthermore, in this embodiment, it is preferable that the volume resistivity value of the insulating layer 211A of the conveyor belt 211 be more than $10^{13}\Omega$cm and that the volume resistivity value of the conductive layer 211B be less than $10^{8}\Omega$cm. An appropriate thickness of the insulating layer 211A is approximately 50 to 200 μm.

The cleaning operation of the cleaner member 215 for the conveyor belt 211 will now be described in more detail with reference to FIGS. 3 and 5 to 9.

Referring to FIG. 3, the recording sheet 203 is conveyed from right to left at a constant recording speed by the conveyor belt 211. However, if the recording sheet 203 is not conveyed and does not reach the eject tray 250 because of some abnormality in the middle of the conveyance, a display of a sheet jam is made and the eject sensor 262 initiates a pause in the recording operation. The user removes the jammed sheet, and, after disposing of the sheet jam, the cleaning operation is executed by automatically or manually operating the cleaning device before engaging in additional recording operations.

The cleaner member 215 in this embodiment will be described with reference to FIG. 3. The blade 243 is shaped in the form of a plate or a chip made of polyurethane rubber and is fixed to attachment plate 243A. The attachment plate 243 is fixed to the bracket 242 rotatably mounted on a rotary pin 133 which is disposed in parallel with driving roller 212. The absorber 245 is fixed to a case 245A which is fixed to the bracket 244 rotatably mounted on the rotary pin 133. Furthermore, a plunger angle (not shown), having an electromagnetic plunger 143 (shown in FIG. 8) for contacting with and separating the blade 243 from the belt 211 and an electromagnetic plunger 144 (shown in FIG. 8) for contacting with and separating the absorber 245 from the belt 221, is mounted to a front arm (not shown) and a rear arm (not shown) to which the roller 212 is attached. A drive arm (not shown) for transmitting a stroke of the plunger 143 to the bracket 242 and a drive arm (not shown) for transmitting a stroke of the plunger 144 to the bracket 244 are rotatably mounted to a support pin (not shown) fixed to the plunger angle. Extension springs (not shown) are hung between the bracket 242 and the plunger angle and the bracket 244 and the plunger angle, respectively, so that the blade 243 and the absorber 245 are separated from the belt 211 when the plungers 143 and 144 are not pulled.

When the the blade 243 is pressed against the conveyor belt 211 by driving the plunger 143, a wiper edge of the blade 243 securely abuts against conveyor belt 211 across its entire width. In this state, conveyor belt 211 is driven by driving roller 212, and the unnecessary ink on conveyor belt 211 is forced against the blade 243 and swept away from conveyor belt 211. In this embodiment, blade 243 is pressed against the portion of conveyor belt 211 that is wrapped around driving roller 212 and which has little resilience and is hard to be transformed by pressure. The blade attachment surface is disposed almost vertically so that the ink swept by the blade 211 promptly drips from the blade 211.

The disposed ink is gathered in an ink receiver 123. An absorber (not shown) may be mounted in the ink receiver 123 to receive the ink in order to prevent the inside of the apparatus from being soiled. Although most of the disposed ink naturally dries and evaporates, another unillustrated tank may be mounted to receive the ink from the ink receiver 123 if the amount of the disposed ink is large. The absorber 245 is made of a continuous porous material (spongy material).

Figure 5:
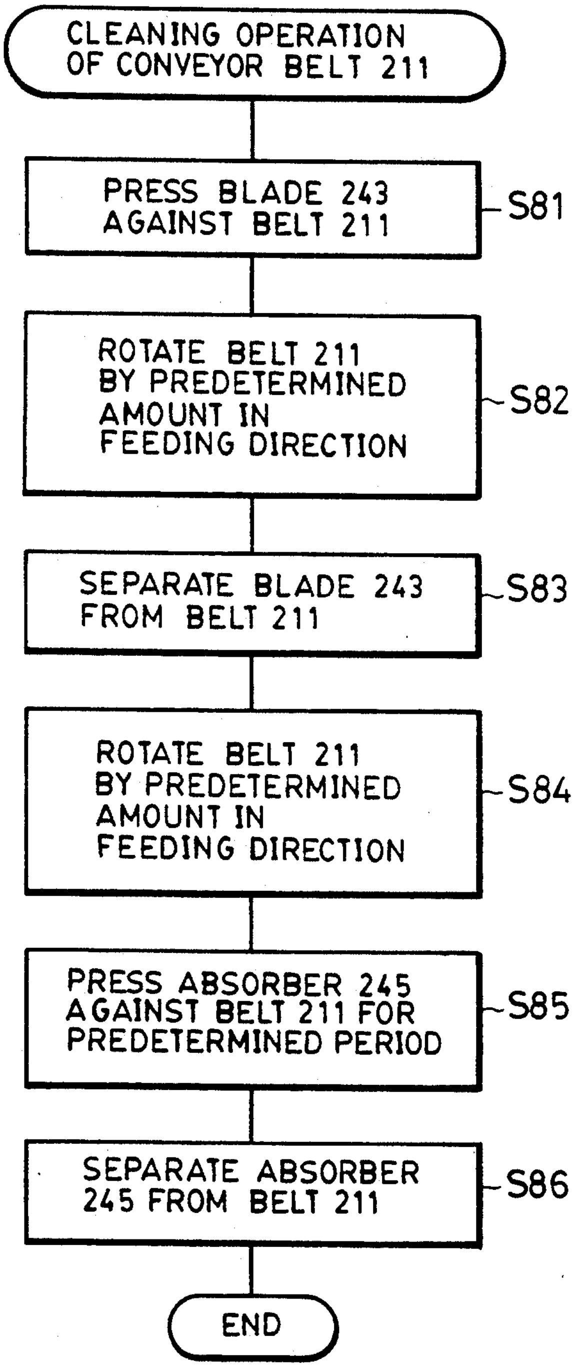
FIGS. 5, 6 and 7 are flowcharts of cleaning operations.

The cleaning operation will be described in detail according to the flowchart shown in FIG. 5. First, the plunger 143 is operated to press the blade 243 against the belt 211 in Step S81. Then, the conveyor belt 211 is moved so that the part thereof where the ink is adhered passes the blade 243, and most of the ink is swept by the blade 243 in Step S82. When the conveyor belt 211 is stopped after the sweep of the ink is completed, the plunger 143 is turned off to separate the blade 243 from the belt 211 in Step S83.

Subsequently, in Step S84, the belt 211 is moved by the distance at which the belt 211 moves when the blade 243 and the absorber 245 abuts against the belt 211.

This movement aims to subsequently clear the belt 211 of residual ink drops, left by the track of the blade edge, by the absorber 245.

In Step S85, the absorber 245 is pressed against the belt 211 by the plunger 144 for an arbitrary time. After that, the plunger 144 is turned off in Step S86 so as to separate the absorber 245 from the belt 211. The cleaning sequence of the belt 211 is completed and the sequence at the time when the eject operation is completed is executed again.

Figure 6:
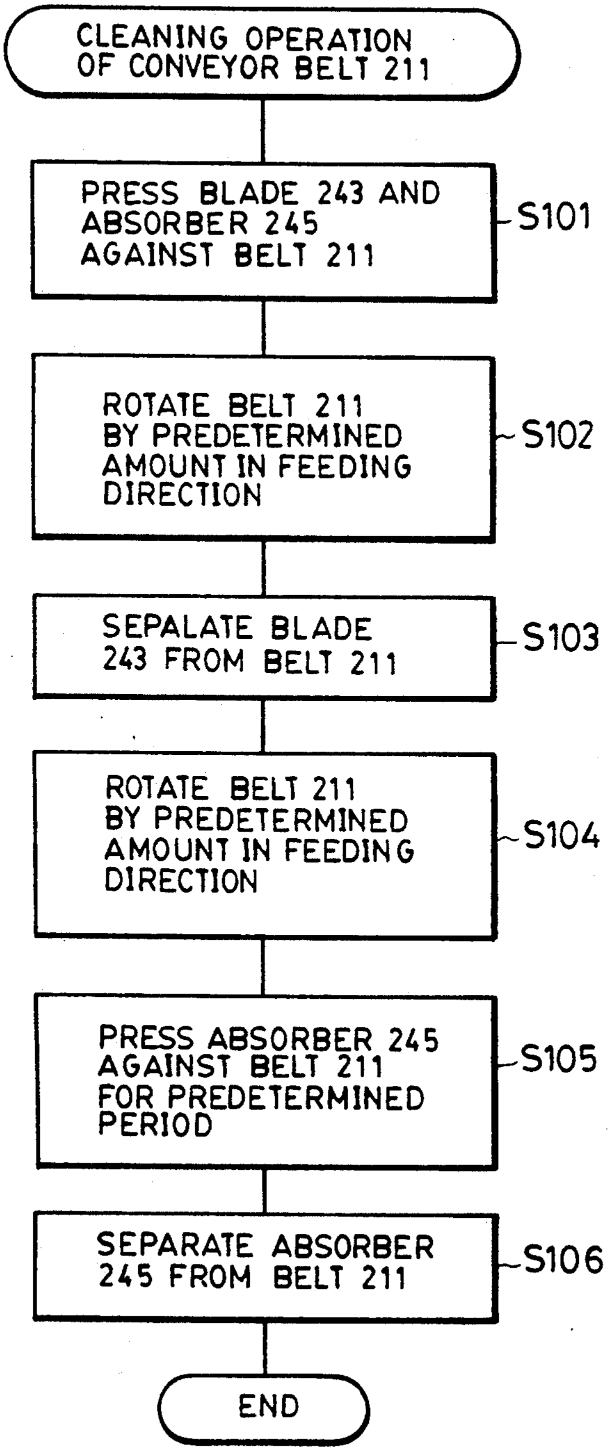

The sequence shown in FIG. 6 may be suitable depending on the mechanism of the recording apparatus. If the driving force of conveyor belt 211 does not have any margin when the blade 243 is pressed against conveyor belt 211, the performance of the blade 243 of sweeping out the ink on conveyor belt 211 may be lowered. In this case, the absorber 245 is pressed against conveyor belt 211 simultaneously with the press of the blade 243, thereby complementing the cleaning operation.

First, in step S101, the blade 243 and the absorber 245 are pressed against conveyor belt 211. In Step S102, conveyor belt 211 to which the ink is adhered is moved by a predetermined amount whereby the ink is swept from conveyor belt 211 by the blade 243 and the absorber 245. Subsequently, in Step S103 only the blade 243 is separated from conveyor belt 211, and in Step S104 conveyor belt 211 is moved by the distance at which conveyor belt 211 moves when the blade 243 and the absorber 245 abut against conveyor belt 211. In Step S105, conveyor belt 211 is stopped in this state for an arbitrary time, the absorber 245 is separated from the belt 211. The cleaning sequence of conveyor belt 211 is completed at this point.

Although a fixed sequence is executed regardless of the amount of jetted ink in the above description, a cleaning time is set corresponding to the maximum ink jet amount in this case. If the ink jet amount is extremely small, it is likely that the blade 243 will be turned up and chatter will be caused.

Figure 7:
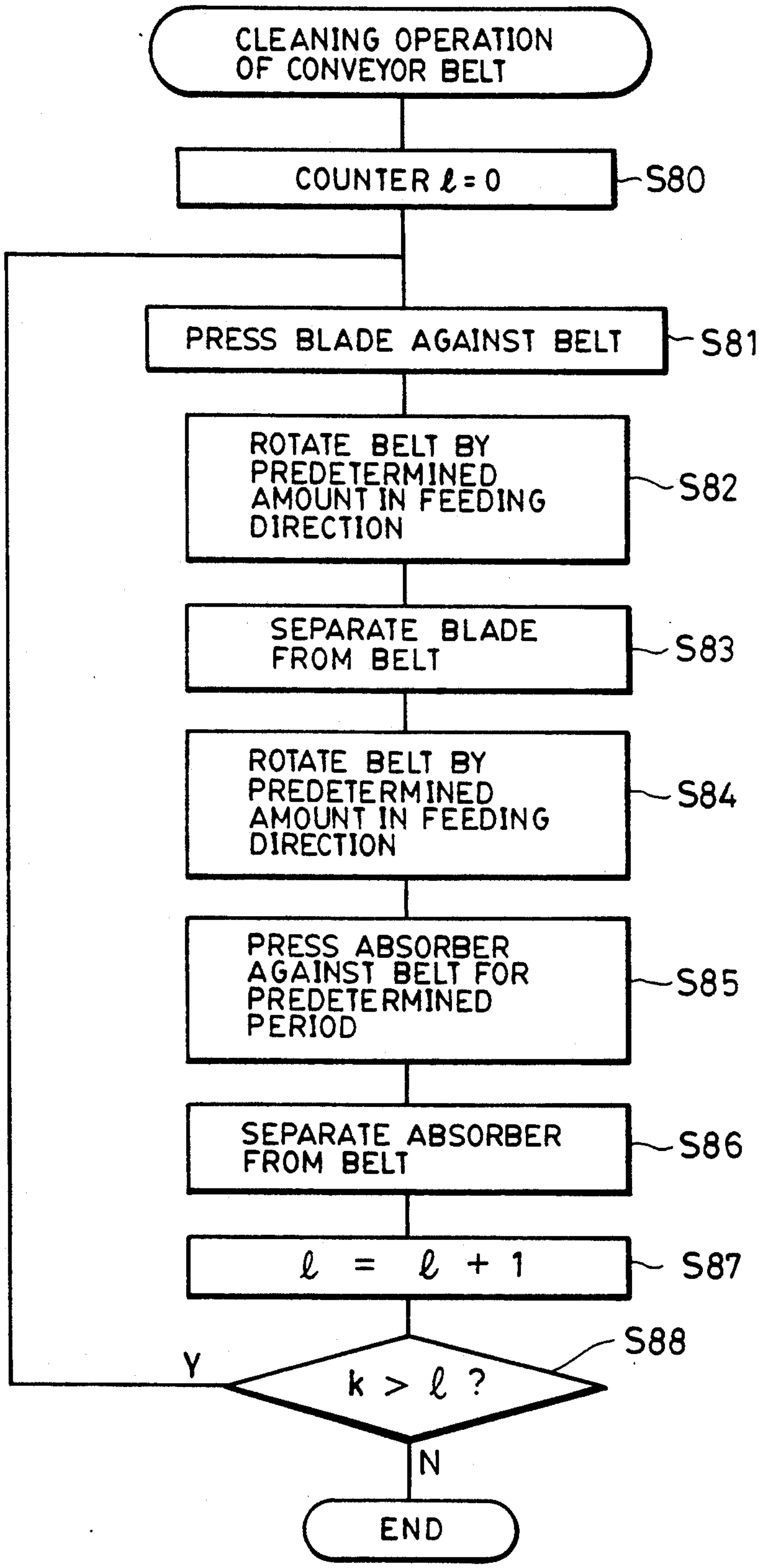
Figure 8:
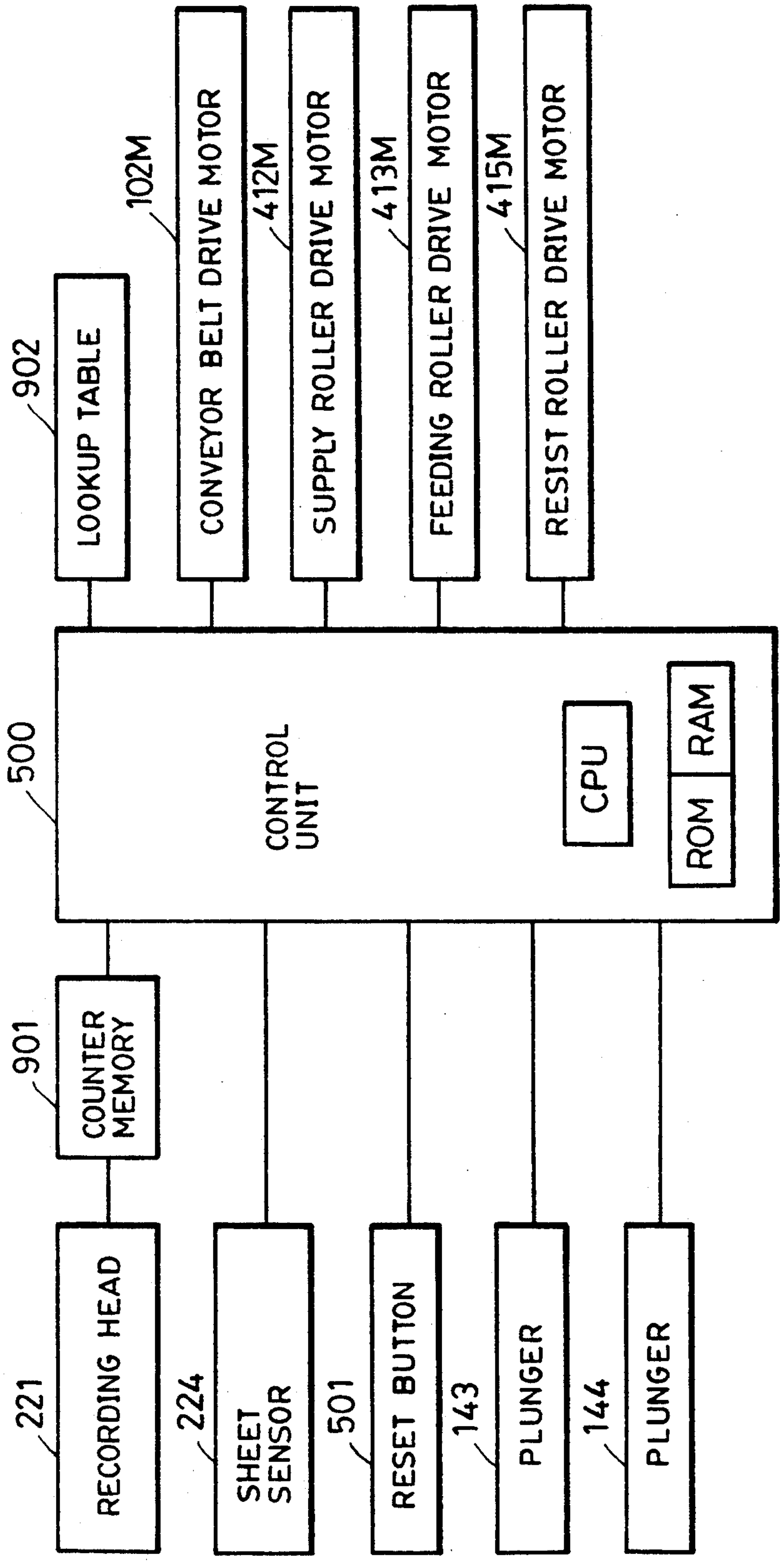
FIG. 8 is a block diagram of an ink jet recording apparatus to which a preferred embodiment is applied.

Furthermore, another embodiment will be described. In the embodiment, the sequence is changed depending upon the actual ink jet amount. FIG. 7 is a flowchart of the embodiment and FIG. 8 is a block diagram thereof. The block diagram shown in FIG. 8 is also applied to the above-mentioned embodiments.

When the cleaning operation is started, a counter l is set at 0 (Step S80). Then, Steps S81 to S86 shown in FIG. 5 are executed except that a predetermined rotation amount n in Step S82 and a contact time m of the absorber 245 in Step S85 are variable. The value of the counter l is then increased by one (Step S87) and compared with a constant k described below (Step S88). If l is smaller than the constant k, Step S81 is executed again and the cleaning operation is repeated. If l is larger than or equal to the constant k, the cleaning operation is ended.

The above values of the blade cleaning time n, the absorber contact time m and the constant k are determined depending upon the amount of the ink which is actually jetted onto conveyor belt 211. The determination will be described with reference to FIG. 8.

Referring to FIG. 8, an image signal is transmitted from a control unit 500 to the recording head 221 through a counter memory 901. The counter memory 901 always stores the amount of recording signals for a constant period. When the sensor 224 detects a jam, the amount of recording signals for a time (l/V), which is obtained by dividing the distance l between the first head (BK) to the sensor 224 by the process speed V, is compared with the value preset in a look-up table 902, and the values of the blade cleaning time n, the absorber contact time m and the constant k shown in FIG. 7 are determined (an example of the table in this embodiment is shown in FIG. 9). In other words, the operation time of the conveyor belt drive motor 102M and the plungers 143 and 144 are controlled through the control unit 500 according to the amount of ink. The control unit 500 controls the whole apparatus, and comprises a CPU, such as a microprocessor, a ROM storing the control program of the CPU shown in the flowcharts and various kinds of data, a RAM used as a working area of the CPU and temporarily holding various kinds of data, and so on.

Referring to FIG. 8, a supply roller drive motor 412M drives the supply roller 202A, a feeding roller drive motor 413M drives the feeding rollers 202B and a resist roller drive motor 415M drives the resist rollers 204. These motors 412M, 413M and 415M are controlled by the control unit 500. When a reset button 501 is turned on after the operator finishes jam processing, the sequence mode for cleaning the conveyor belt 211 is started. The control unit 500 also judges that a jam occurs if the sensor 224 does not detect the recording sheet within a first predetermined time after the resist roller 204 starts to rotate, or if the detection of the recording sheet by the sensor 224 is not completed within a second predetermined time.

According to the above embodiments, since the jam in the recording region is easily detected by a detection means, the surface of the conveyor belt is cleaned by a cleaning means disposed downstream of the recording region. Therefore, even if a jam or the like occurs and the ink is jetted onto a part of the recording region by the recording head and the surface of the conveyor belt is soiled, the ink is immediately swept away, it is possible to prevent the charging roller from being soiled and the ink from adhering to the rear of the next sheet of recording material.

If an ink jet recording method is used for recording, the present invention is quite effective for a recording head and a recording apparatus for use in, especially, an ink jet recording method which has a means for generating heat energy as energy used to jet ink (for example, an electro-thermal converter and a laser beam) and changes the state of the ink by the heat energy. This is because it is possible to achieve a high-density and high-precision recording according to such a method.

It is desirable that a typical construction or principle of the method is described based on the basic principle disclosed in, for example, U.S. Pat. Nos. 4,723,129 and 4,740,796. This method is applicable to both, what is called, on-demand and continuous ink jet printing. For example, in the case of the on-demand ink jet printing, this method is effective since heat energy is generated in an electro-thermal converter, disposed corresponding to a sheet or a liquid path where recording liquid (ink) is retained, by applying at least one drive signal corresponding to recording information and for rapidly increasing the temperature of the recording liquid over the temperature of nucleate boiling, and film boiling is caused in the recording liquid near the thermal action surface of the recording head, and as a result, one air bubble corresponding to one drive signal can be formed in the recording liquid. The recording liquid is jetted into air through the jet opening by an action force produced in the growth and contraction processes of the bubble so as to form at least one drop. If the drive signal is shaped in a pulse, since the growth and contraction of the bubble is immediately and properly executed, it is possible to achieve recording liquid jetting having an excellent responsibility. A suitable drive signal is disclosed in U.S. Pat. Nos. 4,463,359 and 4,345,262. The use of conditions described in U.S. Pat. No. 4,313,124 concerning the temperature rise rate of the above thermal action surface can achieve a more excellent recording.

The present invention includes the construction of a recording head disclosed in the above patents, that is, the construction in combination of a jet opening, a liquid path and an electro-thermal converter (linear liquid passage or rectangular liquid passage), and in addition, the construction, in which the thermal action portion is bent, disclosed in U.S. Pat. Nos. 4,558,333 and 4,459,600.

Furthermore, as described above, the present invention is effectively applicable to a full-line recording head having the length corresponding to the maximum width of a recording material which is recordable by a recording apparatus. Such a recording head may be constituted by the combination of a plurality of recording heads to have the above length or by an integral recording head.

In addition, the present invention is also effective to an exchangeable chip-type recording head in which an electrical connection to the body of the apparatus and the ink supply from the body of the apparatus are made possible by the attachment thereof to the body of the apparatus, or a cartridge type recording head unitarily mounted with an ink tank.

The addition of the recovery means for the recording head, preliminary auxiliary means and so on is preferable since the advantages of the present invention are further stabled thereby. Specifically, the addition of a capping means for the recording head, a cleaning means, a pressure or suction means, a preliminary heating means composed of an electro-thermal converter, another heating element, or the combination of the electro-thermal converter and the heating element, or the execution of a preliminary jetting mode for performing preliminary jetting operation apart from the recording operation, is effective in achieving a stable recording.

As for the kind and number of recording heads to be mounted, for example, one recording head may be mounted corresponding to a monotone ink, or a plurality of recording heads may be mounted corresponding to a plurality of inks different in color or density. In other words, for example, although the recording mode is not limited to a recording mode using a main single color, such as black, and a recording head may be composed of either an integral head or the combination of a plurality of heads, the present invention is extremely effective for an apparatus using a plurality of different colors or full colors by mixture.

Additionally, although the ink is a liquid in the above embodiments of the present invention, the ink may be, for example, a solid which is softened or liquidized when a recording signal is applied.

In addition, the ink jet recording apparatus of the present invention may be used as an image output terminal of an information processing apparatus, such as a computer, a copying apparatus in combination with a reader or the like, a facsimile apparatus having a transmit and receiving function, or the like.

As described above, according to the present invention, it is possible to provide a conveyor means which can restrain unnecessary ink from being jetted when a recording material is jammed, and a recording apparatus having such a conveyor means. It should also be understood that the present invention is not limited to the conveying means of the type depicted in the embodiments, but also includes transport devices generally as well.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A transport device for use in a recording apparatus including recording means with an ink jet recording head for recording onto a recording material and further including detection means for detecting said recording material, comprising:

a conveyor belt having a first semiconductive layer darkened to be discriminable from a recording material by said detection means, a second insulating layer below said first layer and a third conductive layer below said second layer, wherein said first layer of said conveyor belt has a volume resistivity value of less than $10^{13}\ \Omega$ cm;

drive means for driving said conveyor belt; and charging means for charging said conveyor belt, wherein said detection means comprises a detector for discriminating between a recording material and said first layer of the conveyor belt.

2. A transport device according to claim 1, wherein said first layer of said conveyor belt is a urethane.

3. A transport device according to claim 1, wherein said first layer of said conveyor belt is a silicon black paint.

4. A transport device according to claim 1, wherein said first layer of said conveyor belt has a thickness of 5 to 30$\mu$.

5. A transport device according to claim 1, wherein said recording means has an ink jet recording head that records by use of heat energy in an electro-thermal converter to jet ink.

6. A transport device according to claim 1, wherein said recording means has an ink jet recording head for jetting ink from a jetting opening by growth of a bubble produced by heat from an electro-thermal converter over film boiling.

7. A recording apparatus in which a recording material is conveyed by an endless charged belt and a recording head records by ejecting ink on said recording material in a predetermined recording region, comprising:

detection means for detecting a jam of said recording material in said predetermined recording region; and cleaning means disposed downstream of said recording region in contact with said conveyor belt to clean a surface of said conveyor belt, said conveyor belt including a first layer made of conductive or semiconductive material having a thickness of 5 to 30 $\mu$m and a volume resistivity value lower than a predetermined value and discriminable from a recording material by said detection means, a second insulating layer below said first layer and a third conductive layer below said second layer, wherein said detection means has a reflective optical detection device at each side of an upstream region and a downstream region, with respect to a movement direction of the belt, of the predetermined recording region, each said detection device receiving a reflected light from said recording material and said conveyor belt, wherein said first layer of said conveyor belt has a reflectance different from that of said recording material, and wherein said ejection of ink is stopped when a jam is detected by said detection means.

8. A recording apparatus according to claim 7, wherein said recording head jets ink toward said recording material in said recording region by changing the ink into flying ink drops and shooting said drops at said recording material so as to perform recording.

9. A recording apparatus according to claim 8, wherein said recording head has an electro-thermal conversion device for generating heat energy to cause film boiling in said ink as a device for generating energy to jet said ink.

10. A recording apparatus for performing recording onto a recording material, comprising:

an ink jet head for jetting ink onto said recording material so as to perform recording;

detection means for detecting a jam of said recording material;

conveyor means for conveying said recording material;

cleaning means for cleaning ink from said conveyor means; and control means for controlling a cleaning operation by said cleaning means in accordance with an amount of ink jetted from said ink jet head after detection of the jam by said detection means.

11. A recording apparatus according to claim 10, wherein said cleaning means comprises a blade and an ink absorber.

12. A recording apparatus according to claim 10, wherein said conveyor means comprises a conveyor belt and said ink absorber is contactable with said conveyor belt after said blade contacts said conveyor belt.

13. A recording apparatus according to claim 10, wherein said control means controls an amount of movement of said conveyor means in accordance with the ink amount of the jetted ink while said cleaning means is in contact with said conveyor means.

14. A recording apparatus according to claim 10, wherein said conveyor means comprises a conveyor belt, and said conveyor belt has a first conductive or semiconductive layer discriminable from said recording material by said detection means, a second insulating layer below said first layer and a third conductive layer disposed below said second layer.

15. A recording apparatus according to claim 10, wherein said ink jet head records by using heat energy in an electro-thermal converter to jet ink.

16. A recording apparatus according to claim 10, wherein said ink jet head records by jetting ink from a jetting opening by the growth of a bubble produced by heat from an electro-thermal converter over film boiling.

17. A recording apparatus having an ink jet recording device, comprising:

a recording plane area positioned apart from said ink jet recording device at a location where a recording material is positioned for recording on by said ink jet recording device in accordance with a recording signal; and a recording material transporting device including a conveyor belt and a charging device for charging a conveyor belt upstream of said recording plane area, said conveyor belt including a semiconductive surface layer, an insulating layer below said surface layer and a conductive layer below said insulating layer, wherein said semiconductive surface layer of said conveyor belt has a volume resistivity of less than $10^{13}$ Ω cm., and whereby said recording material is transported fully adhering to said belt while at said recording plane area, and is separated from said belt after recording has ended.

18. A recording apparatus according to claim 17, wherein said ink jet recording device is capable of color-recording and has plural full-line recording heads whereby an area corresponding to a maximum width of a recording material can be recorded.

19. A recording apparatus according to claim 18, wherein said recording means has an ink jet recording head for jetting ink from a jetting opening by growth of a bubble produced by heat from an electro-thermal converter over film boiling.

* * * * *

UNITED STATES PATENT AND TRADEMARK OFFICE

CERTIFICATE OF CORRECTION

PATENT NO. : 5,225,852

DATED : July 6, 1993

INVENTOR(S) : TAKASHI UCHIDA, ET AL.

It is certified that error appears in the above-indentified patent and that said Letters Patent is hereby corrected as shown below:

IN THE DRAWINGS

Sheet 6 of 9, FIG. 6, in box S103, "SEPALATE" should read --SEPARATE--; and

Sheet 9 of 9, FIG. 9, "ABSORBOR" should read --ABSORBER--.

COLUMN 8

Line 41, "blade 211" should read --blade 243--; and "blade 211." should read --blade 243.--.

Signed and Sealed this

Twenty-sixth Day of April, 1994

Attest:

Bruce Lehman

BRUCE LEHMAN

Attesting Officer

Commissioner of Patents and Trademarks